(No Model.)

J. BENTZ.
ENAMELING METAL SURFACES.

No. 596,317. Patented Dec. 28, 1897.

WITNESSES:
Charles B. Mann Jr.
Chas. P. Heinemann.

INVENTOR:
John Bentz
By Chas. B. Mann
ATTORNEY.

UNITED STATES PATENT OFFICE.

JOHN BENTZ, OF BALTIMORE, MARYLAND.

ENAMELING METAL SURFACES.

SPECIFICATION forming part of Letters Patent No. 596,317, dated December 28, 1897.

Application filed January 5, 1897. Serial No. 617,997. (No specimens.)

*To all whom it may concern:*

Be it known that I, JOHN BENTZ, a citizen of the United States, residing at Baltimore, in the State of Maryland, have invented certain new and useful Improvements in Enameling Metal Surfaces, of which the following is a specification.

My invention relates to certain new and useful improvements in enameled metal surfaces.

The object of the invention is to provide for applying to the metal surface a foundation-coat, and before said coat is dry to apply means for producing an inlaid crystal-stone decoration, and then to have the two applications receive but one burning.

The crystal-stone decoration referred to may be applied in a variety of forms, to wit: It may consist of stripes inlaid in the foundation-coat, it may consist of granules or pebbles inlaid, or it may consist of inlaid decoration of any fanciful form.

The drawings herewith illustrate my invention.

Figure 1:
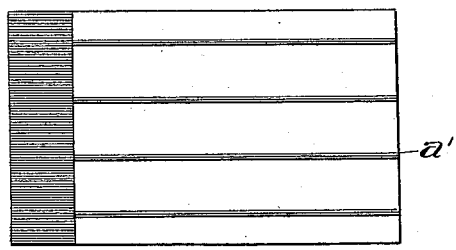
Figure 2:
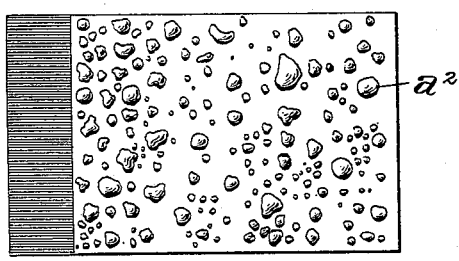
Figure 3:
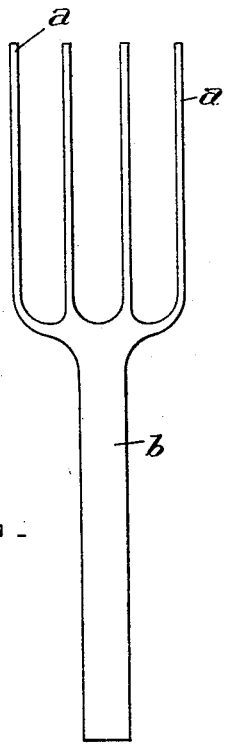

Figure 1 shows a piece of metal to which the foundation-coat is applied and stripes of crystal stone inlaid therein. Fig. 2 shows a piece of metal enameled by means of the foundation-coat and granules or pebbles of stone inlaid. Fig. 3 is a view of a device employed to produce the stripes of crystal stone for inlaying.

The article or metal piece of whatever form which is to be enameled should first be annealed, scaled, pickled, and washed in alkaline water, as is usually done as a preliminary step to the enameling process. The metal is then ready for the foundation-coat. So far as concerns my process of "inlaying" it is immaterial what particular formula is followed for the foundation-coat to produce the enamel. Perhaps any of the well-known compositions for producing the enamel glaze may be used. The compositions here referred to must be applied while in a semiliquid or pasty condition. A good composition which I have employed for the foundation consists of one hundred parts feldspar, sixty parts quartz, seventy-five parts borax, fifteen parts soda, ten parts fluorspar, twelve parts saltpeter, six parts bone-dust, and five parts sienite. These are properly pulverized and mixed, and sufficient oxid of antimony and cobalt are added, and the whole is melted, cooled, and ground, and to the mass I add about three per cent. of English ball-clay and water sufficient to produce the desired consistency for dipping. Of course the proportions of the parts of this composition may be varied, and some of the ingredients may be dispensed with.

The composition for producing the crystal stone consists of the following: forty parts feldspar, thirty parts borax, five parts sienite, three parts cryolite, two parts soda, two parts oxid of iron. These are well mixed and melted. To produce the stripes of crystal stone for inlaying into the foundation-coat, I employ an instrument made of wire and shown in Fig. 3 of the drawings. This instrument has a number of teeth $a$ like the prongs of a rake or fork, and has a handle $b$. While the crystal-stone composition is in proper condition—that is, hot, fused, and viscid—the teeth or prongs of this instrument are dipped into the said composition and drawn out again, and the hot composition adheres to the teeth and pulls out in the form of strings $a'$, which are then laid across the foundation-coat which has been placed over the surface of the metal. These strings or strips of crystal-stone composition must be applied to the metal directly after the foundation-coat has been applied and while the latter is still wet. The metal article thus treated is then to be dried and subsequently placed in an oven and baked. Although two applications have been made to the metal only one burning is made.

It will be understood that while the hot-composition stripes $a'$ are plastic they become embedded in the wet foundation-coat, and hence are "inlaid," or, in other words, a crystal-stone enamel is inlaid in a coating applied on the metal surface, and both coating and inlaid parts are developed by one and the same baking. When finished, the crystal-stone parts project slightly in relief and have a cameo effect.

To produce the form of inlaying shown in Fig. 2, where granules or pebbles $a^2$ are embedded in the foundation-coat, the following is the procedure: When the plastic crystal-stone composition is in proper condition—that is, while hot—it is allowed to run into cold water, which has the effect to granulate it or to produce small pebbles. These crystal grains or pebbles are then dried and loosened or separated and may be taken by the hand and placed or embedded into the foundation-coat while the latter is wet. Should it be desired to have the grains or pebbles all over the enamel-surface, the said grains may be placed in a suitable sieve, and by means of the latter the said grains or pebbles may be sifted and thereby deposited on the wet surface of the foundation-coat and caused to adhere and embed therein. The metal article, with the foundation-coat and the adhering crystal pebbles, is then placed in an oven and baked, as already described with reference to the stripes.

The effect of a metal surface coated with one color or style of enamel and crystal-stone enamel in any form—such as stripes, pebbles, or otherwise inlaid in said coat, but in relief—is very beautiful and attractive.

Of course the color or style of the crystal-stone enamel may be varied and slightly contrasting with reference to the foundation-coat.

Having thus described my invention, what I claim is—

1. The process of enameling metal surfaces, which consists of coating the metal article with a foundation-coat of enameling composition; applying to said coat while it is still moist artificial crystal-stone composition in the form of stripes, grains, pebbles, or other fanciful form, so as to embed the same in the foundation-coat, but have the inlaid particles projecting slightly; then subjecting the metal article to heat in a baking-oven so that one baking will develop the foundation-coat and merge the artificial crystal-stone composition therein and produce a cameo effect.

2. The process of enameling metal surfaces, which consists of coating the metal article with a foundation-coat of enameling composition; applying to said coat while it is still moist artificial crystal-stone composition in hot, fused and viscid condition; then subjecting the metal article to heat in a baking-oven so that one baking will develop the foundation-coat and merge the artificial crystal-stone composition therein.

In testimony whereof I affix my signature in the presence of two witnesses.

JOHN BENTZ.

Witnesses:
JOHN C. VOLLBRACHT,
THOS. C. BAILEY.